(12) United States Patent
Zhang et al.

(10) Patent No.: US 12,500,496 B2
(45) Date of Patent: Dec. 16, 2025

(54) STATOR-AND-ROTOR STRUCTURE AND AXIAL MAGNETIC FIELD MOTOR

(71) Applicant: WUXI INFIMOTION TECHNOLOGY CO., LTD., Jiangsu (CN)

(72) Inventors: Shengchuan Zhang, Wuxi (CN); Xuebo Xiong, Wuxi (CN); Liang Fang, Wuxi (CN); Tao Han, Wuxi (CN); Haisheng Yu, Wuxi (CN); Yanjun Tan, Wuxi (CN); Xiaozhe Lin, Wuxi (CN); Ruiping Wang, Wuxi (CN); Ingo Scholten, Wuxi (CN)

(73) Assignee: WUXI INFIMOTION TECHNOLOGY CO., LTD., Jiangsu (CN)

( * ) Notice: Subject to any disclaimer, the term of this patent is extended or adjusted under 35 U.S.C. 154(b) by 356 days.

(21) Appl. No.: 17/798,317

(22) PCT Filed: Feb. 11, 2022

(86) PCT No.: PCT/CN2022/076075
§ 371 (c)(1),
(2) Date: Mar. 30, 2023

(87) PCT Pub. No.: WO2023/045222
PCT Pub. Date: Mar. 30, 2023

(65) Prior Publication Data
US 2024/0186871 A1    Jun. 6, 2024

(30) Foreign Application Priority Data

Sep. 22, 2021    (CN) .......................... 202111105831.1

(51) Int. Cl.
*H02K 16/00*    (2006.01)
*H02K 1/16*    (2006.01)
(Continued)

(52) U.S. Cl.
CPC ............... *H02K 16/00* (2013.01); *H02K 1/16* (2013.01); *H02K 1/2796* (2022.01); *H02K 1/2798* (2022.01); *H02K 2201/03* (2013.01)

(58) Field of Classification Search
CPC .. H02K 1/02; H02K 1/04; H02K 1/06; H02K 1/16; H02K 1/165; H02K 1/26;
(Continued)

(56) References Cited

U.S. PATENT DOCUMENTS

| 5,245,238 | A | * | 9/1993 | Lynch | .................... | H02K 21/24 |
| | | | | | | 310/116 |
| 6,049,149 | A | | 4/2000 | Lin et al. | | |

(Continued)

FOREIGN PATENT DOCUMENTS

| CN | 102948049 A | 2/2013 |
| CN | 105141060 A | 12/2015 |

(Continued)

OTHER PUBLICATIONS

17798317_2024-11-12_WO_2006077812_A1_H.pdf (Year: 2024).*
(Continued)

*Primary Examiner* — Christopher M Koehler
*Assistant Examiner* — Ahmed F Seck (57) ABSTRACT

A stator-and-rotor structure and an axial magnetic field motor are provided. The stator-and-rotor structure is a dual-stator and dual-rotor structure. Permanent magnets of the outer rotor is fixed on a rotor yoke portion, the inner rotor has no rotor yoke portion, permanent magnets of the inner rotor is fixed on a rotor support, the inner stator core has no stator yoke portion, and the outer stator core has a stator yoke portion.

15 Claims, 4 Drawing Sheets

(51) Int. Cl.
*H02K 1/2796* (2022.01)
*H02K 1/2798* (2022.01)

(58) Field of Classification Search
CPC ........ H02K 1/265; H02K 1/27; H02K 1/2706;
H02K 1/2793; H02K 1/2795; H02K
1/2796; H02K 1/28; H02K 1/2798
See application file for complete search history.

(56) References Cited

U.S. PATENT DOCUMENTS

| | | | | |
|---|---|---|---|---|
| 7,977,843 | B2* | 7/2011 | Atarashi | H02K 1/165 310/216.074 |
| 9,318,938 | B2* | 4/2016 | Carpenter | H02K 5/203 |
| 2002/0171324 | A1* | 11/2002 | Smith | H02K 3/28 310/268 |
| 2005/0179336 | A1 | 8/2005 | Hasebe et al. | |
| 2005/0179337 | A1 | 8/2005 | Hasebe et al. | |
| 2007/0046124 | A1* | 3/2007 | Aydin | H02K 1/2796 310/156.32 |
| 2009/0072083 | A1* | 3/2009 | Hanlon | B64C 13/505 310/114 |
| 2009/0230811 | A1* | 9/2009 | Asano | H02K 1/2796 310/216.001 |
| 2010/0253085 | A1 | 10/2010 | Minowa et al. | |
| 2011/0291511 | A1 | 12/2011 | Crocker | |
| 2012/0126653 | A1* | 5/2012 | Yang | H02K 1/146 310/156.32 |
| 2013/0127275 | A1* | 5/2013 | Camilleri | H02K 7/088 310/90 |
| 2015/0008779 | A1* | 1/2015 | Shi | H02K 1/16 310/89 |
| 2018/0219441 | A1 | 8/2018 | Thiele et al. | |
| 2020/0028393 | A1 | 1/2020 | Ravaud | |
| 2021/0265901 | A1* | 8/2021 | Li | H02K 1/14 |

FOREIGN PATENT DOCUMENTS

| | | | | |
|---|---|---|---|---|
| CN | 107710567 | A | 2/2018 | |
| CN | 110676996 | A | 1/2020 | |
| CN | 111884454 | A | 11/2020 | |
| CN | 112332627 | A | 2/2021 | |
| CN | 112564442 | A | 3/2021 | |
| CN | 112688515 | A | 4/2021 | |
| CN | 112688518 | A | 4/2021 | |
| CN | 113949177 | A | 1/2022 | |
| EP | 2190107 | A1 | 5/2010 | |
| EP | 2377230 | B1 | 8/2013 | |
| IT | 201900010008 | A1 * | 12/2020 | ............ H02K 21/24 |
| JP | 2010057281 | A | 3/2010 | |
| JP | 2012513184 | A | 6/2012 | |
| JP | 2017536082 | A | 11/2017 | |
| KR | 20000018845 | A | 4/2000 | |
| KR | 20090123903 | A | 12/2009 | |
| KR | 20150080843 | A | 7/2015 | |
| WO | WO8603351 | A1 | 6/1986 | |
| WO | WO-2006077812 | A1 * | 7/2006 | ............ H02K 1/146 |
| WO | WO2020088488 | A1 * | 5/2020 | ............ H02K 1/14 |

OTHER PUBLICATIONS

17798317_2024-11-12_WO_2020088488_A1_H.pdf (Year: 2024).*
17798317_2024-11-18_IT_201900010008_A1_H.pdf (Year: 2024).*
European Search Report for 22747233.9 Mailed Jul. 18, 2023.
The First Office Action dated Aug. 19, 2022 for Chinese Patent Application No. 202111105831.1 and English Translation.
The Second Office Action dated Feb. 22, 2023 for Chinese Patent Application No. 202111105831.1 and English Translation.
The Third Office Action dated Oct. 12, 2023 for Chinese Patent Application No. 202111105831.1 and English Translation.
Office Action dated Jan. 23, 2024 for Korean Patent Application No. 10-2022-7031385 and English Translation.
Office Action dated Nov. 21, 2023 for Japanese Patent Application No. 2022-548800 and English Translation.
Office Action dated Dec. 18, 2023 for Chinese Patent Application No. 202111105831.1 and English Translation.
International Search Report for PCT/CN2022/076075 Mailed Jun. 10, 2022.
Written Decision dated Jul. 29, 2025 received in corresponding patent family application No. KR1020227031385. English translation attached.

* cited by examiner

STATOR-AND-ROTOR STRUCTURE AND AXIAL MAGNETIC FIELD MOTOR

CROSS-REFERENCE TO RELATED APPLICATION

The present disclosure is a U.S. National Phase Entry of International Application PCT/CN2022/076075 having an international filing date of Feb. 11, 2022, which claims priority of Chinese Patent Application No. 202111105831.1, entitled "Stator-and-rotor structure and Axial Magnetic Field Motor," and filed to the CNIPA on Sep. 22, 2021, the contents of which are incorporated herein by reference.

TECHNICAL FIELD

The present disclosure relates, but is not limited to motors, in particular to a stator-and-rotor structure and an axial magnetic field motor.

BACKGROUND

With rapid development of new energy vehicles, motor systems, as key new energy driving systems, come into a period of rapid development. Because of its high torque density, high efficiency and good heat dissipation performance, especially its compact axial dimension, the axial magnetic field motor attracts more and more research institutions to strengthen their research efforts on the axial magnetic field motor, and has become a research hotspot in the field of motors. However, there is still a space for improvement in torque density of the axial magnetic field motor.

SUMMARY

The following is a summary of subject matters described in detail herein. This summary is not intended to limit the protection scope of the claims.

In an embodiment of that present disclosure, a stator-and-rotor structure is provided, which includes a first rotor, a first stator, a second rotor and a second stator sequentially disposed at intervals in an axial direction, wherein the first rotor includes a first rotor yoke portion and multiple first rotor permanent magnets disposed at circumferential intervals on a side of the first rotor yoke portion facing the first stator, the second rotor includes a non-magnetic permeable second rotor support and multiple second rotor permanent magnets disposed at circumferential intervals on the second rotor support, the first stator includes a first stator core including multiple first stator core tooth portions disposed at circumferential intervals, the second stator includes a second stator core including a second stator core yoke portion and multiple second stator core tooth portions disposed at circumferential intervals on a side of the second stator core yoke portion facing the second rotor, and an axial closed-loop magnetic path is formed between the first rotor yoke portion and the second stator core yoke portion.

In an embodiment of that present disclosure, an axial magnetic field motor is further provided, which includes a casing, a rotating shaft, and the stator-and-rotor structure according to any one of above-mentioned embodiments, wherein the first rotor and the second rotor are sleeved on the rotating shaft, and the first stator and the second stator are fixedly connected with the casing.

Other aspects will become apparent upon reading and understanding of the drawings and detailed description.

> 10-1—stator tooth portion, 10-2—stator insulating support, 10-3—stator winding, 20-1—left rotor yoke portion, 20-2—left rotor permanent magnet, 30-1—right rotor yoke portion, 30-2—right rotor permanent magnet;
>
> 1—second stator, 2—second rotor, 3—first stator, 4—first rotor, 1-1—second stator core, 1-2—second stator insulating support, 1-3—second stator winding, 1-11—second stator core tooth portion, 1-12—second stator core yoke portion, 2-1—second rotor support, 2-2—second rotor permanent magnet, 2-11—second rotor support inner ring, 2-12—second rotor support connector, 2-13—second rotor support outer ring, 3-1—first stator core, 3-2—first stator insulating support, 3-3—first stator winding, 3-11—first stator core tooth portion, 3-12—first stator core pole piece, 4-1—first rotor permanent magnet, 4-2—first rotor yoke portion.

DETAILED DESCRIPTION

Technical solutions in embodiments of the present disclosure will be clearly and completely described below with reference to the drawings of the embodiments of the present disclosure. The described embodiments are just a part of the embodiments of the present disclosure, but not all of the embodiments of the present disclosure. Based on the embodiments of the present disclosure all other embodiments obtained without creative effort by those of ordinary skills in the art fall within the protection scope of the present disclosure.

In the description of the present disclosure, "exemplary" or "for example" is meant as an example, example illustration, or illustration. Any embodiment described in the present disclosure as "exemplary" or "for example" should not be construed as being more preferred or advantageous than other embodiments. The term "and/or" herein is description of an association relationship between associated objects, which indicates that there may be three relationships, for example, A and/or B may indicate three cases: A alone, both A and B, and B alone. In the description of the present disclosure, "multiple" means at least two, e.g. two, three, unless explicitly specified otherwise.

Orientation indications (such as up, down, left, right, front, back) in the embodiments of the present disclosure are only used for explaining the relative positional relationship and motion of multiple components under a specific posture, instead of indicating or implying that the indicated structure has a specific orientation, or it is constructed and operated in a specific orientation. If the specific posture is changed, the orientation indications will change accordingly. Therefore, they cannot be understood as limitations on the present disclosure. In addition, descriptions such as those relating to "first", "second" in the embodiments of the present disclosure are for descriptive purposes only and cannot be understood as indicating or implying their relative importance or imply the number of technical features indicated. Thus, a feature defined with "first", "second" may explicitly or implicitly include at least one feature.

In this disclosure, the terms "connection" and "fixing" should be understood in a broad sense unless otherwise explicitly specified and limited, for example, "fixing" may be a fixed connection, or may be a detachable connection, or an integral connection; it may be a mechanical connection or it may be an electrical connection; it may be a direct connection, or indirect connection through an intermediate medium, or may be an internal communication between two elements or an interacting relationship between two elements, unless otherwise explicitly defined. For those of ordinary skills in the art, the detailed meanings of the above terms in the embodiments of the present disclosure may be understood according to specific situations.

Technical solutions in the embodiments of the present disclosure may be combined with each other, but on the basis that those of ordinary skills in the art can implement it. When the combination of the technical solutions is contradictory or impossible to be implemented, it should be considered that the combination of the technical solutions does not exist and is not within the protection scope as claimed by the present disclosure.

Figure 1:
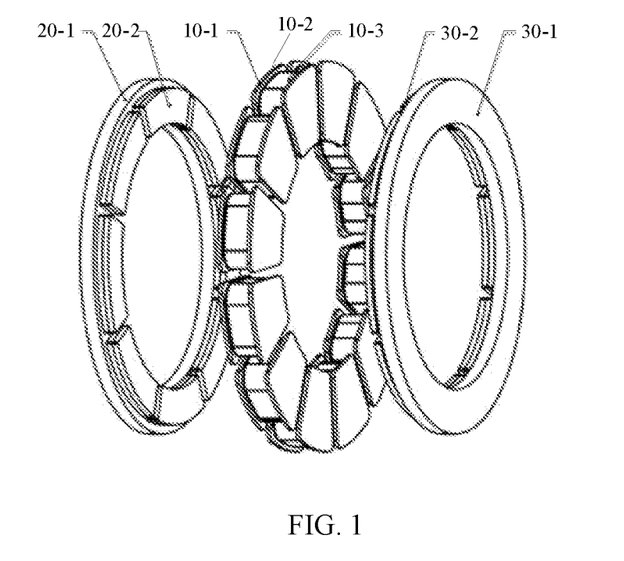
FIG. 1 is a schematic diagram of a dual-rotor single-stator structure.

FIG. 1 shows a dual-rotor single-stator structure, including two rotors and a stator disposed between the two rotors. For convenience of expression, a rotor on a left side in the figure can be referred to as a left rotor, and a rotor on a right side can be referred to as a right rotor. As shown in the figure, the left rotor includes a left rotor yoke portion 20-1 and left rotor permanent magnets 20-2 disposed at circumferential intervals on a side of the left rotor yoke portion 20-1 facing the stator, and the right rotor includes a right rotor yoke portion 30-1 and right rotor permanent magnets 30-2 disposed at circumferential intervals on a side of the right rotor yoke portion 30-1 facing the stator. The stator includes stator tooth portions 10-1, stator insulating supports 10-2 and stator windings 10-3, without a stator yoke portion, wherein the stator windings 10-3 are wound on the stator insulating supports 10-2, and the stator insulating supports 10-2 are sleeved on the stator tooth portions 10-1. An axial magnetic field motor without stator yoke portion can produce a higher torque output by using a large magnetic field area of a disk structure of the axial magnetic field motor. However, there is still a space for improvement in torque density of the axial magnetic field motor without stator yoke portion.

Figure 2:
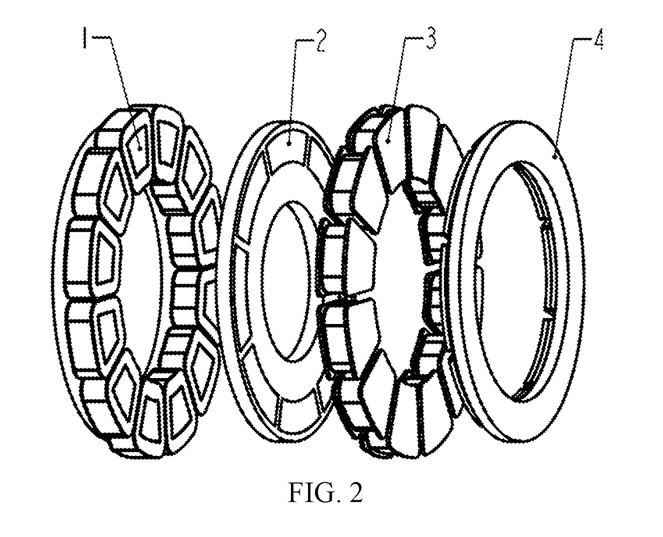
FIG. 2 is an exploded view of a stator-and-rotor structure according to an exemplary embodiment of the present disclosure.
Figure 3:
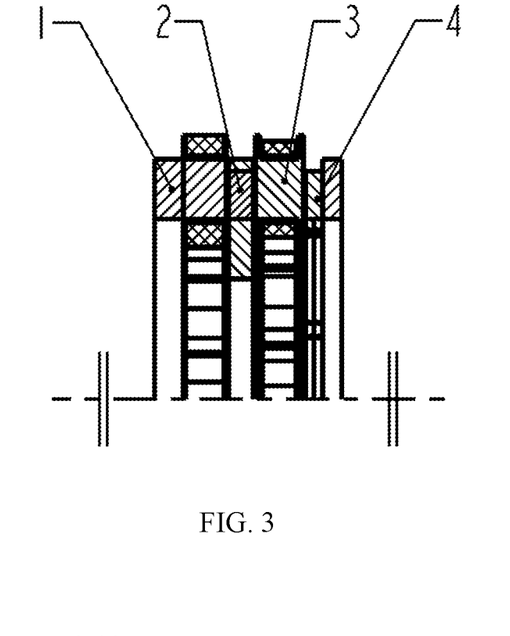
FIG. 3 is a cross-sectional view of the stator-and-rotor structure shown in FIG. 2 after assembling.

In an exemplary embodiment of the present disclosure, an axial magnetic field motor with higher torque density and higher efficiency is proposed. The axial magnetic field motor has three air gaps, and a stator-and-rotor structure of the axial magnetic field motor is shown in FIGS. 2 to 7. Among them, FIG. 2 is an exploded view of the stator-and-rotor structure, and FIG. 3 is a cross-sectional view taken along a radial direction after the stator-and-rotor structure is assembled. FIGS. 4 to 7 are perspective views of two stators and two rotors respectively.

As shown in the figures, the stator-and-rotor structure includes a first rotor 4, a first stator 3, a second rotor 2 and a second stator 1 sequentially disposed at intervals in the axial direction (see FIG. 2). The first rotor 4 includes a first rotor yoke portion 4-2 and multiple first rotor permanent magnets 4-1 disposed at circumferential intervals on a side of the first rotor yoke portion 4-2 facing the first stator 3 (see FIG. 7). The second rotor 2 includes a non-magnetic permeable second rotor support 2-1 and multiple second rotor permanent magnets 2-2 disposed at circumferential intervals on the second rotor support 2-1 (see FIG. 5). The first stator 3 includes a first stator core 3-1, wherein the first stator core 3-1 includes multiple first stator core tooth portions 3-11 disposed at circumferential intervals (see FIG. 6). The second stator 1 includes a second stator core 1-1, wherein the second stator core 1-1 includes a second stator core yoke portion 1-12 and multiple second stator core tooth portions 1-11 disposed at circumferential intervals on a side of the second stator core yoke portion 1-12 facing the second rotor 2 (see FIG. 4). An axial closed-loop magnetic path is formed between the first rotor yoke portion 4-2 and the second stator core yoke portion 1-12.

An air gap between the first rotor 4 and the first stator 3 may be referred to as a first air gap, an air gap between the first stator 3 and the second rotor 2 may be referred to as a second air gap, and an air gap between the second rotor 2 and the first stator 1 may be referred to as a third air gap.

In the stator-and-rotor structure shown in FIG. 2, both of the multiple first rotor permanent magnets 4-1 and the multiple second rotor permanent magnets 2-2 are axially magnetized and are in one-to-one correspondence in the axial direction. The corresponding first rotor permanent magnets 4-1 and the second rotor permanent magnets 2-2 have a same magnetizing direction, two adjacent first rotor permanent magnets 4-1 have opposite magnetizing directions, and two adjacent second rotor permanent magnets 2-2 have opposite magnetizing directions.

Figure 8:
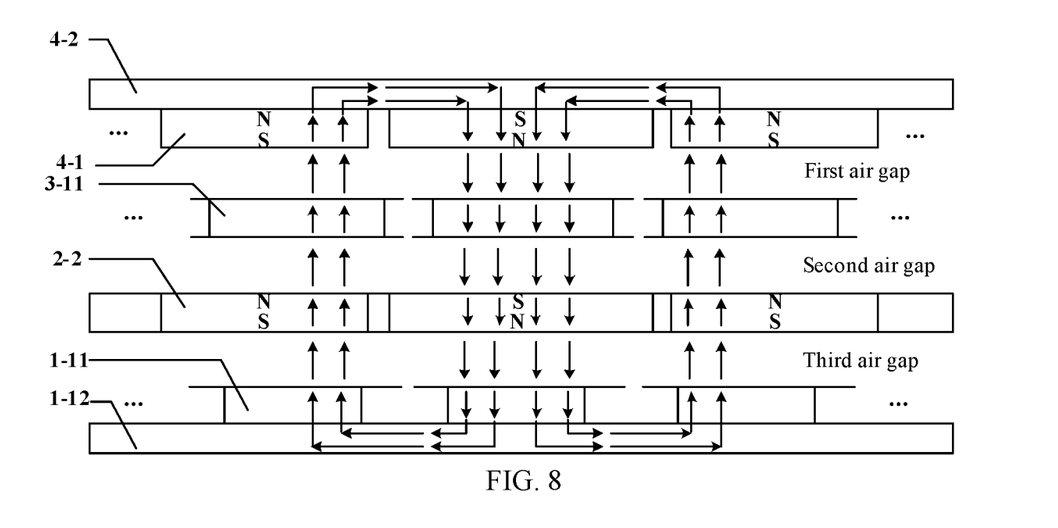
FIG. 8 is a schematic diagram of a set of closed magnetic paths of the stator-and-rotor structure shown in FIG. 2.

Referring to FIG. 8, for convenience of presentation, only associated magnetic paths of three sequentially adjacent first rotor permanent magnets 4-1 are shown in the figure. It can be seen from the figure that an N pole of a first rotor permanent magnet 4-1 in the middle faces the first air gap, while S poles of first rotor permanent magnets 4-1 on the two sides face the first air gap. Two adjacent first rotor permanent magnets 4-1 have opposite magnetizing directions. As shown in the figure, in three second rotor permanent magnets 2-2 corresponding to the three first rotor permanent magnets 4-1 (the second rotor permanent magnet 2-2 corresponding to one first rotor permanent magnet 4-1 is the second rotor permanent magnet 2-2 whose projection on a radial plane of all the second rotor permanent magnets 2-2 has the largest coincidence with the projection of the first rotor permanent magnet on the radial plane), wherein the magnetizing directions of the first rotor permanent magnet 4-1 and the second rotor permanent magnet 2-2 correspondingly disposed are the same. For example, the first rotor permanent magnet 4-1 in the middle and the second rotor permanent magnet 2-2 in the middle shown in FIG. 8 correspond to each other, and the magnetizing directions of these two permanent magnets are indicated in azimuth according to the figure, with N poles at the bottom and S poles at the top. Likewise, the first rotor permanent magnet 4-1 on the left side corresponds to the second rotor permanent magnet 2-2 on the left side and these two permanent magnets have a same magnetizing direction. The first rotor permanent magnet 4-1 on the right side corresponds to the second rotor permanent magnet 2-2 on the right side and these two permanent magnets have a same magnetizing direction. The magnetizing directions of the two first rotor permanent magnets 4-1 and the two second rotor permanent magnets 2-2 are both N poles at the top and S poles at the bottom. The magnetizing directions of two adjacent second rotor permanent magnets 2-2 are opposite.

In the example of the stator-and-rotor structure shown in FIG. 2, eight first rotor permanent magnets 4-1 are included, four of the eight first rotor permanent magnets 4-1 are first rotor permanent magnets 4-1 with N poles facing the first air gap, and four of the eight first rotor permanent magnets 4-1 are first rotor permanent magnets 4-1 with S poles facing the first air gap. The first rotor permanent magnets 4-1 with the N poles facing the first air gap and the first rotor permanent magnets 4-1 with the S poles facing the first air gap are disposed in a staggered manner. While each first rotor permanent magnet 4-1 with the N pole facing the first air gap and two adjacent first rotor permanent magnets 4-1 form a group, the eight first rotor permanent magnets on the first rotor 4 in the illustrated example can be divided into four groups, and the magnetic path conditions of individual groups of first rotor permanent magnets are consistent. Either of the first rotor permanent magnets 4-1 and the second rotor permanent magnets 2-2 may be, for example, permanent magnet steel.

In an exemplary embodiment of the present disclosure, there are multiple groups of axial closed-loop magnetic paths between the first rotor yoke portion 4-2 and the second stator core yoke portion 1-12 of the stator-and-rotor structure. According to requirement on the magnetizing direction of the first rotor permanent magnets 4-1, the number of the first rotor permanent magnets 4-1 is even, and the number of the groups of the closed-loop magnetic paths is ½ of the number of the first rotor permanent magnets 4-1. Each group of the closed-loop magnetic paths can be seen in FIG. 8, in which short lines with arrows are configured to indicate paths and directions of magnetic lines of force. As shown in FIG. 8, each group of the closed-loop magnetic paths starts from an N pole of one first rotor permanent magnet 4-1 facing the first air gap, pass through the first air gap, the first stator core tooth portion 3-11, the second air gap, a second rotor permanent magnet 2-2 corresponding to the first rotor permanent magnet 4-1, the third air gap and the second stator core tooth portion 1-11 along the axial direction, and then returns from the second stator core yoke portion 1-12 to both sides. After passing through the second stator core tooth portion 1-11, the third air gap, two second rotor permanent magnets 2-2 adjacent to the corresponding second rotor permanent magnet 2-2, the second air gap, the first stator core tooth portion 3-11, the first air gap and two first rotor permanent magnets 4-1 adjacent to the first rotor permanent magnet 4-1 along the axial direction, the closed-loop magnetic paths return from the first rotor yoke portion 4-2 to the S pole of the first rotor permanent magnet 4-1 to form a closed loop.

Figure 6:
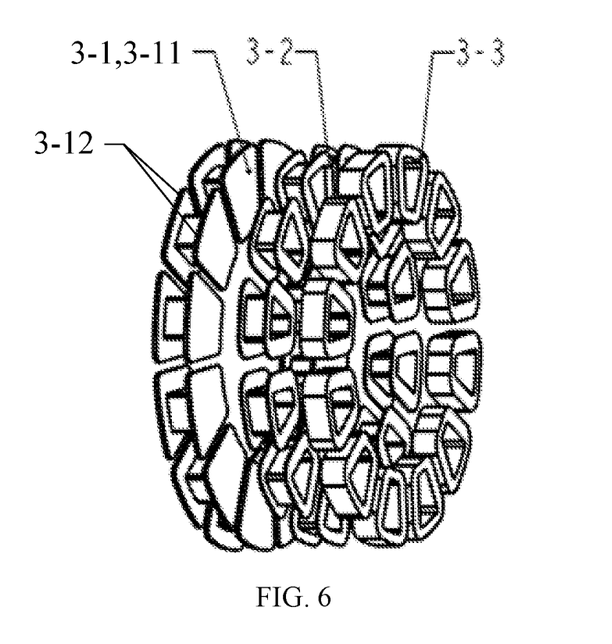
FIG. 6 is a schematic diagram of multiple components of a first stator in FIG. 2.

FIG. 6 is a schematic diagram of multiple components of a first stator 3 according to an exemplary embodiment of the present disclosure. As shown in the figure, the first stator 3 includes a first stator core 3-1, wherein the first stator core 3-1 includes multiple first stator core tooth portions 3-11 disposed at circumferential intervals. The first stator 3 further includes multiple first stator insulating supports 3-2 and multiple first stator windings 3-3, which are disposed in one-to-one correspondence with the multiple first stator core tooth portions 3-11. In an exemplary embodiment, as shown in the figure, the first stator 3 further includes first stator core pole pieces 3-12 disposed on peripheries of two axial end faces of each first stator core tooth portion 3-11, a the first stator insulating support 3-2 is sleeved in an annular groove formed by side walls of the first stator core tooth portions 3-11 and two first stator core pole pieces 3-12. The first stator winding 3-3 is wound on the first stator insulating support 3-2, for example, it can be wound in the annular groove on a side wall of the first stator insulating support 3-2. During manufactured, an annular first stator insulating support 3-2 can be designed to be composed of two half rings, and after the two half rings are sleeved at corresponding positions of the annular groove, the first stator winding 3-3 is wound on the first stator insulating support 3-2.

In an exemplary embodiment of the present disclosure, the multiple first stator core tooth portions 3-11 are sequentially spliced into a ring by non-magnetic permeable material, wherein the non-magnetic permeable material may be disposed in a gap between two adjacent first stator core tooth portions 3-11. In another exemplary embodiment, the multiple first stator core tooth portions 3-11 are connected by a non-magnetic permeable annular support that can be respectively connected with two axial end faces of the multiple first stator core tooth portions 3-11 to connect the multiple first stator core tooth portions 3-11 as a whole. The annular support can also be disposed in an annular space formed by the multiple first stator core tooth portions 3-11 so as to be respectively connected with one side of each of the multiple first stator core tooth portions 3-11 facing the axis. In another exemplary embodiment, the multiple first stator core tooth portion 3-11 may be molded as a whole by injection molding.

In an exemplary embodiment of the present disclosure, a first stator core 3-1 without a stator yoke portion is implemented by a process of dividing the core, and is directly molded from Soft Magnetic Composite materials (SMC), so that the manufacturing process is simple, convenient and has high productive efficiency, and is convenient for automatic winding. The soft magnetic composite materials have high resistivity and low eddy current loss, so they are particularly suitable for high frequency motors with axial magnetic fields. Usually, when the frequency is higher than 400 Hz, relative loss of the soft magnetic composite materials is lower than that of silicon steel sheet materials.

Figure 4:
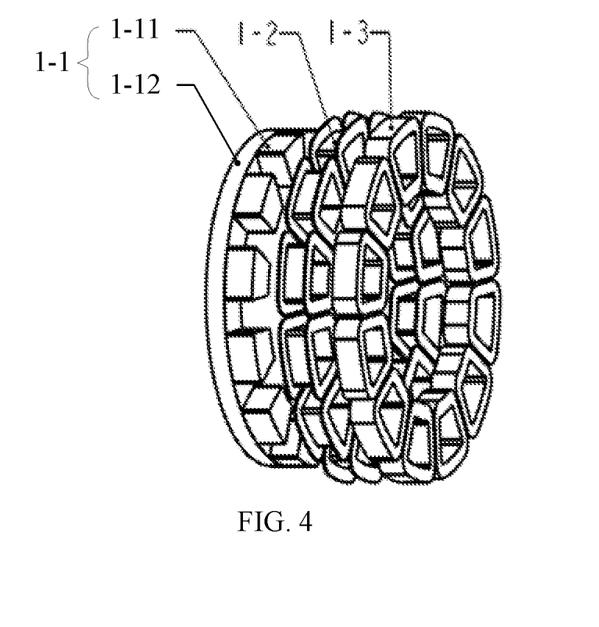
FIG. 4 is a schematic diagram of multiple components of a second stator in FIG. 2.

FIG. 4 is a schematic diagram of multiple components of a second stator 1 according to an exemplary embodiment of the present disclosure. As shown in the figure, the second stator 1 includes a second stator core 1-1, wherein the second stator core 1-1 includes a second stator core yoke portion 1-12 and multiple second stator core tooth portions 1-11 disposed at circumferential intervals on a side of the second stator core yoke portions 1-12 facing the second rotor 2. The second stator 1 further includes multiple second stator insulating supports 1-2 and multiple second stator windings 1-3, which are disposed in one-to-one correspondence with the multiple second stator core tooth portions 1-11. The annular second stator insulating supports 1-2 are sleeved on sidewalls of the second stator core tooth portions 1-11 respectively, and the second stator windings 1-3 are wound on the second stator insulating supports 1-2. In the illustrated example, the second stator windings 1-3 are wound in annular grooves on the sidewalls of the second stator insulating supports 1-2 respectively.

In an exemplary embodiment of the present disclosure, the second stator core 1-1 with a stator yoke portion may be formed by punching and coiling a silicon steel sheet, or it may be directly molded from a soft magnetic composite material, the manufacturing process is simple, convenient and has high productive efficiency. The soft magnetic composite material has high resistivity and low eddy current loss, especially suitable for high-frequency motors with axial magnetic fields, Usually, when the frequency is higher than 400 Hz, the relative loss of the soft magnetic composite material is lower than that of a silicon steel sheet material, and when the frequency is lower than 400 Hz, the relative loss of the silicon steel sheet material is lower than that of the soft magnetic composite material. When a design of an axial magnetic field motor focuses more on the efficiency at low frequency, the second stator core 1-1 with stator yoke portion can be made by a process of coiling a silicon steel sheet. When the design of the axial magnetic field motor focuses more on the cost and productive efficiency, the second stator core 1-1 with stator yoke portion can be directly molded from a soft magnetic composite material. When manufactured in any of the above modes, the second stator core yoke portion 1-12 and the multiple second stator core tooth portions 1-11 can be integrally formed. In an exemplary embodiment, the second stator core yoke portion 1-12 and the multiple second stator core tooth portions 1-11 may be respectively manufactured and integrated into one piece.

In an exemplary embodiment of the present disclosure, the first stator core 3-1 without stator yoke portion is directly molded from a soft magnetic composite material, the second stator core 1-1 with stator yoke portion is manufactured by coiling a silicon steel sheet, and the relative loss of the silicon steel sheet material under a low frequency (usually below 400 Hz) is lower than that of the soft magnetic composite material, so that an axial magnetic field motor with the stator-and-rotor structure according to this embodiment can take account of the efficiencies under high frequencies and efficiencies under low frequencies at the same time.

Figure 7:
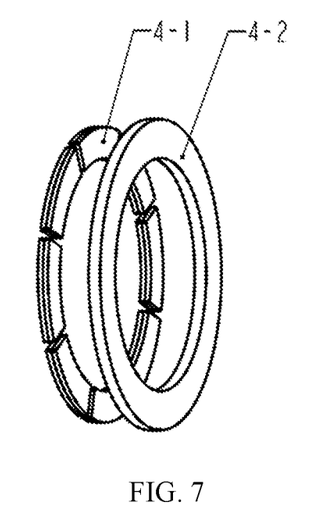
FIG. 7 is a schematic diagram of multiple components of the first rotor in FIG. 2.

FIG. 7 is a schematic diagram of multiple components of a first rotor 4 according to an exemplary embodiment of the present disclosure. As shown in the figure, the first rotor 4 includes a first rotor yoke portion 4-2 and multiple first rotor permanent magnets 4-1 disposed at circumferential intervals on a side of the first rotor yoke portion 4-2 facing the first stator 3. In the illustrated example, the first rotor yoke portion 4-2 is an annular magnetic disk with multiple locating slots at circumferential intervals on a side of the annular magnetic disk facing the first stator 3. The multiple first rotor permanent magnets 4-1 are fixed in the multiple locating slots in one-to-one correspondence. In an exemplary embodiment, the first rotor permanent magnets 4-1 of the first rotor 4 with the magnetic disk can be fixed in the corresponding locating shallow slot on the magnetic disk, and fixed to the magnetic disk by glue bonding or injection molding.

Figure 5:
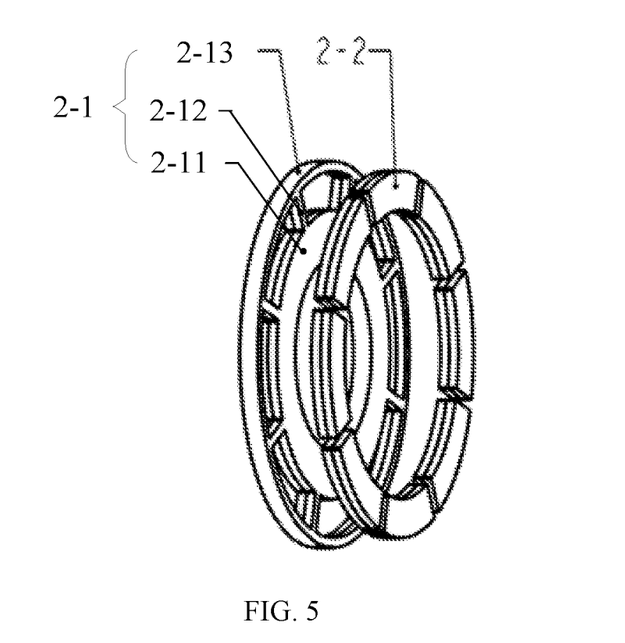
FIG. 5 is a schematic diagram of multiple components of the second rotor in FIG. 2.

FIG. 5 is a schematic diagram of multiple components of a first rotor 4 according to an exemplary embodiment of the present disclosure. As shown in the figure, a second rotor 2 includes a non-magnetic permeable second rotor support 2-1 and multiple second rotor permanent magnets 2-2 disposed at circumferential intervals on the second rotor support 2-1. In the illustrated example, the second rotor support 2-1 includes a second rotor support inner ring 2-11, a second rotor support outer ring 2-13 and multiple second rotor support connectors 2-12 extended radially between the inner ring and the outer ring. The multiple second rotor support connectors 2-12 divide an annular space between the second rotor support inner ring 2-11 and the second rotor support outer ring 2-13 into multiple sector-shaped through slots, and the multiple second rotor permanent magnets 2-2 are fixed in the multiple through slots in one-to-one correspondence. Second rotor permanent magnets of a second rotor 2 without magnetic disk is fixed in a high-strength rotor support made from a non-magnetic permeable material and can be sealed as a whole by injection molding. In an exemplary embodiment, the second rotor support 2-1 is made from a non-magnetic permeable high-strength alloy material, which has good mechanical strength and can be operated at higher rotational speeds.

In the embodiment shown in FIG. 2, each of the first rotor and the second rotor is provided with eight permanent magnets, and the number of the tooth portions on each of of the first stator and the second stator is twelve, wherein shapes of the permanent magnets and the tooth portions are sector blocks. The number of the permanent magnets and the tooth portions can be determined according to the design requirements of an axial magnetic field motor.

In an exemplary embodiment of the present disclosure, the stator-and-rotor structure is an axial field motor architecture with two stators and two rotors. A first rotor permanent magnet 4-1 of an outer first rotor 4 is fixed on the first rotor yoke portion 4-2, an inner second rotor 2 has no rotor yoke portion, and second rotor permanent magnets 2-2 are fixed on the second rotor support 2-1. An inner first stator core 3-1 has no stator yoke portion, and an outer second stator core 1-1 has a second stator core yoke portion 1-12. Magnetic flux of the stator-and-rotor structure according to the embodiment passes through three air gaps, the air gap magnetic fields implement energy transmission, and output torque can be increased by about 50% compared with the axial magnetic field motor of the same size with two rotors and one stator, so that a torque density of the motor is greatly improved.

According to an exemplary embodiment of the present disclosure, an axial magnetic field motor is provided, which includes a casing, a rotating shaft and the stator-and-rotor structure described in any embodiment of the present disclosure, wherein a first rotor 4 and a second rotor 2 in the stator-and-rotor structure are sleeved on the rotating shaft of the axial magnetic field motor, and a first stator 3 and a second stator 1 are fixedly connected with the casing of the axial magnetic field motor. The first rotor 4 and the second rotor 2 may be sleeved directly on the rotating shaft, or may be sleeved on the rotating shaft through an intermediate support or another component.

Compared with an axial magnetic field motor with two rotors and one stator, for the axial magnetic field motor without rotor yoke portion on one side and with a stator core with stator yoke portion added, the stator yoke portion and the rotor yoke portion on the other side form a magnetic path closed loop. Magnetic flux of the whole magnetic path can transfer energy through three air gaps, which can increase an output torque by about 50%, and make a torque density of the axial magnetic field motor greatly improved.

Although implementations disclosed in the present disclosure are as described above, the described contents are only implementations used for facilitating understanding of the present disclosure, and are not intended to limit the present disclosure. Without departing from the spirit and scope disclosed in the present disclosure, any person skilled in the art to which the present disclosure pertains may make any modifications and changes in the form and details of implementation, but the protection scope of the present disclosure shall still be defined by the appended claims.

The invention claimed is:

1. A stator-and-rotor structure, sequentially comprising a first rotor, a first stator, a second rotor and a second stator disposed at intervals in an axial direction, enabling the first rotor to be located at one end of the stator-and-rotor structure and the second stator to be located at another end of the stator-and-rotor structure opposite to the one end, wherein the first rotor comprises a first rotor yoke portion and a plurality of first rotor permanent magnets disposed at circumferential intervals on a side of the first rotor yoke portion facing the first stator, the second rotor comprises a non-magnetic permeable second rotor support and a plurality of second rotor permanent magnets disposed at circumferential intervals on the second rotor support, the first stator comprises a first stator core comprising a plurality of first stator core tooth portions disposed at circumferential intervals, the second stator comprises a second stator core comprising a second stator core yoke portion and a plurality of second stator core tooth portions disposed at circumferential intervals on a side of the second stator core yoke portion facing the second rotor, and an axial closed-loop magnetic path is formed between the first rotor yoke portion of the first rotor and the second stator core yoke portion of the second stator;

wherein both of the plurality of first rotor permanent magnets and the plurality of second rotor permanent magnets are axially magnetized and are in one-to-one correspondence in the axial direction, the correspondingly disposed first rotor permanent magnets and the second rotor permanent magnets have a same magnetizing direction, two adjacent first rotor permanent magnets have opposite magnetizing directions, and two adjacent second rotor permanent magnets have opposite magnetizing directions; and wherein an air gap between the first rotor and the first stator is a first air gap, an air gap between the first stator and the second rotor is a second air gap, and an air gap between the second rotor and the second stator is a third air gap;

a plurality of groups of axial closed-loop magnetic paths are provided, each group of the axial closed-loop magnetic paths starts from an N pole of one of the first rotor permanent magnets facing the first air gap, pass through the first air gap, a first stator core tooth portion, the second air gap, a second rotor permanent magnet corresponding to the first rotor permanent magnet, the third air gap and the second stator core tooth along the axial direction, and then returns from the second stator core yoke portion to both sides; after passing through a second stator core tooth portion, the third air gap, two second rotor permanent magnets adjacent to the corresponding second rotor permanent magnet, the second air gap, the first stator core tooth portion, the first air gap and two first rotor permanent magnets adjacent to the first rotor permanent magnet along the axial direction, the closed-loop magnetic paths return from the first rotor yoke portion to an S pole of the first rotor permanent magnet.

2. The stator-and-rotor structure according to claim 1, wherein:
the first stator core is directly molded from a soft magnetic composite material.

3. The stator-and-rotor structure according to claim 1, wherein:
the first stator further comprises a plurality of first stator insulating supports and a plurality of first stator windings, which are disposed in one-to-one correspondence with the plurality of first stator core tooth portions; each first stator core tooth portion is provided with first stator core pole pieces at peripheries of two axial end faces, a first stator insulating support is sleeved in an annular groove formed by side walls of the first stator core tooth portions and the two first stator core pole pieces, and the first stator windings are wound on the first stator insulating supports.

4. The stator-and-rotor structure according to claim 1, wherein:
the plurality of first stator core tooth portions are sequentially spliced into a ring by a non-magnetic permeable material, or connected by a non-magnetic permeable annular support, or formed into a whole by injection molding.

5. The stator-and-rotor structure according to claim 1, wherein:
the second stator core is formed by punching and coiling a silicon steel sheet, or directly molded from a soft magnetic composite material.

6. The stator-and-rotor structure according to claim 1, wherein:
the second stator further comprises a plurality of second stator insulating supports and a plurality of second stator windings, which are disposed in one-to-one correspondence with the plurality of second stator core tooth portions; the second stator insulating supports are sleeved on sidewalls of the second stator core tooth portions, and the second stator windings are wound on the second stator insulating supports.

7. The stator-and-rotor structure according to claim 1, wherein:
the first rotor yoke portion is an annular magnetic disk with a plurality of locating slots at circumferential intervals on a side of the annular magnetic disk facing the first stator, and the plurality of first rotor permanent magnets are fixed in the plurality of locating slots in one-to-one correspondence.

8. The stator-and-rotor structure according to claim 1, wherein:
the second rotor support comprises a second rotor support inner ring, a second rotor support outer ring and a plurality of second rotor support connectors extended radially between the second rotor support inner ring and the second rotor support outer ring, and the plurality of second rotor support connectors divide an annular space between the second rotor support inner ring and the second rotor support outer ring into a plurality of sector-shaped through slots, and the plurality of second rotor permanent magnets are fixed in the plurality of through slots in one-to-one correspondence.

9. An axial magnetic field motor comprising a casing, a rotating shaft, and the stator-and-rotor structure according to claim 1, wherein the first rotor and the second rotor are sleeved on the rotating shaft, and the first stator and the second stator are fixedly connected with the casing.

10. The stator-and-rotor structure according to claim 1, wherein:
the first stator core is directly molded from a soft magnetic composite material.

11. The stator-and-rotor structure according to claim 1, wherein:
the first stator further comprises a plurality of first stator insulating supports and a plurality of first stator windings, which are disposed in one-to-one correspondence with the plurality of first stator core tooth portions; each first stator core tooth portion is provided with first stator core pole pieces at peripheries of two axial end faces, a first stator insulating support is sleeved in an annular groove formed by side walls of the first stator core tooth portions and the two first stator core pole pieces, and the first stator windings are wound on the first stator insulating supports.

12. The stator-and-rotor structure according to claim 1, wherein:
the plurality of first stator core tooth portions are sequentially spliced into a ring by a non-magnetic permeable material, or connected by a non-magnetic permeable annular support, or formed into a whole by injection molding.

13. The stator-and-rotor structure according to claim 1, wherein:
the second stator core is formed by punching and coiling a silicon steel sheet, or directly molded from a soft magnetic composite material.

14. The stator-and-rotor structure according to claim 1, wherein:
the second stator further comprises a plurality of second stator insulating supports and a plurality of second stator windings, which are disposed in one-to-one correspondence with the plurality of second stator core tooth portions; the second stator insulating supports are sleeved on sidewalls of the second stator core tooth portions, and the second stator windings are wound on the second stator insulating supports.

15. The stator-and-rotor structure according to claim 1, wherein:
the first rotor yoke portion is an annular magnetic disk with a plurality of locating slots at circumferential intervals on a side of the annular magnetic disk facing the first stator, and the plurality of first rotor permanent magnets are fixed in the plurality of locating slots in one-to-one correspondence.

* * * * *